(12) United States Patent
Halftown et al.

(10) Patent No.: US 6,767,598 B1
(45) Date of Patent: Jul. 27, 2004

(54) LOW DP FOOD CASING FROM HIGH SOLIDS VISCOSE

(75) Inventors: John J. Halftown, Covington, IN (US); Mark D. van der Bleek, Rossville, IL (US); Michael Verellen, Poederlee (BE)

(73) Assignee: Teepak Properties, LLC, Lisle, IL (US)

( * ) Notice: Subject to any disclaimer, the term of this patent is extended or adjusted under 35 U.S.C. 154(b) by 88 days.

(21) Appl. No.: 09/723,681

(22) Filed: Nov. 28, 2000

(51) Int. Cl.[7] .......................... A22C 13/00; B32B 9/04; B29C 1/26; B29C 47/88; D01D 5/24

(52) U.S. Cl. ...................... 428/34.8; 428/543; 264/101; 264/209.1; 264/211.19

(58) Field of Search .............................. 428/34.8, 543; 264/101, 209.1, 211.19

(56) References Cited

U.S. PATENT DOCUMENTS 4,123,589 A * 10/1978 Korlatzki et al. ............ 428/425
5,783,131 A * 7/1998 Stall et al. .................. 264/196

* cited by examiner

*Primary Examiner*—Blaine Copenheaver
*Assistant Examiner*—Shalie Manlove
(74) *Attorney, Agent, or Firm*—Fish & Richardson P.C.

(57) ABSTRACT

A tubular food casing of a tubular cellulose film precipitated from a viscose solution having a viscosity of from about 55 to about 90 ball seconds, where the ball has a density of 8 g/cc and a radius of 0.316 centimeters at a drop of 20 centimeters, and where the solution contains at least eight and one-half weight percent of cellulose. The cellulose has a DPv of from about 300 to about 525 and the cellulose film has a dry film thickness of from about 0.015 mm to about 0.040 mm, a dry burst pressure in excess of 40 cm Hg, per 0.01 mm of dry film thickness, and a rewet burst pressure in excess of 5 cm Hg per 0.01 mm of rewet film thickness.

20 Claims, No Drawings

LOW DP FOOD CASING FROM HIGH SOLIDS VISCOSE

BACKGROUND OF THE INVENTION

The present invention relates to tubular food casings from cellulose films and more particularly relates to tubular food casings formed by extrusion of a solution of cellulose-followed by precipitation of the cellulose to form a tubular cellulose film.

In order to obtain a film that is strong enough and tough enough to be used as a food casing, e.g. for sausage casings, it has traditionally been believed that the cellulose had to have a relatively high molecular weight, e.g. as represented by its degree of polymerization (DP). The degree of polymerization that was believed to be required for a food casing of sufficient strength and toughness for commercial use was at least 560.

In the prior art, in order to dissolve cellulose, it was almost always first treated with sodium hydroxide to reduce the strength of hydrogen bonds and to expand it to permit the solvent to work more easily. Cellulose of sufficient DP to make a food casing, having good enough physical properties to be practical, still could not be dissolved to any significant degree in sodium hydroxide solution alone. However, there are no practical solvents for cellulose that function alone and such practical solvents, as do exist, usually require an alkali metal hydroxide as a cosolvent. Cellulose, for example, will not dissolve in aqueous carbon disulfide, or tertiary amine oxide, to any significant extent unless the cellulose is first expanded (steeped) in sodium hydroxide and the solution itself contains alkali metal hydroxide, preferably sodium hydroxide.

BRIEF DESCRIPTION OF THE INVENTION

The invention is a tubular food casing of a tubular cellulose film precipitated from a viscose solution having a viscosity of from about 55 to about 90 ball seconds, where the ball has a density of 8 g/cc and a radius of 0.316 cm, and where the solution contains at least eight and one-half weight percent of cellulose, said cellulose having a DPv of from about 300 to about 525. The cellulose film has a dry film thickness of from about 0.015 mm to about 0.040 mm, a dry burst pressure in excess of 40 cm Hg, per 0.01 mm of dry film thickness, and a rewet burst pressure in excess of 5 cm Hg per 0.01 mm of rewet film thickness.

The cellulose may be precipitated from solution of non-derivatized cellulose, e.g. from aqueous tertiary amine oxide solution or may be regenerated from a solution of derivatized cellulose, e.g. a solution of cellulose xanthate.

The invention also includes a method for making the cellulose film by:
  a) preparing a viscose solution, containing at least eight and one-half weight percent of cellulose having a DPv of about 300 to about 525, and having a solution viscosity of from about 55 to about 90 ball seconds, where the ball has a density of 8 g/cc and a radius of 0.316 cm.
  b) extruding the solution into the shape of a tube; and
  c) precipitating cellulose from the extruded solution to form a tubular film having a dry film thickness of from about 0.015 mm to about 0.040 mm, a dry burst pressure in excess of 40 cm Hg, per 0.01 mm of dry film thickness, and a rewet burst pressure in excess of 5 cm Hg per 0.01 mm of rewet film thickness.

DETAILED DESCRIPTION OF THE INVENTION

The cellulose used in accordance with the invention has a low DPv, e.g. from about 300 to about 525 and usually from about 400 to about 475. The viscose (xanthate or traditional viscose) may be a derivatized cellulose, e.g. xanthanated with carbon disulfide, dissolved in caustic at a concentration of from about 4.5 to about 6.5 weight percent. The viscose total sulfur concentration is usually from about 1.8 to about 2.5 weight percent and to form a cellulose film, the cellulose is precipitated and regenerated from the xanthate by passing extruded viscose through a bath comprising a strong acid and a salt. The viscose may also be a solution comprising non-derivatized cellulose in a solvent comprising tertiary amine oxide and water (amine oxide viscose) obtained by forming a dilute solution of about 300 to about 525 DPv, preferably about 400 to about 475 DPv, cellulose and removing water by vaporization. The cellulose is precipitated by extruding the viscose and passing the extruded viscose through a wash bath containing water to remove tertiary amine oxide.

The viscose may also be a solution of non-derivatized cellulose in aqueous alkali. It has been surprisingly found that solutions of cellulose having low DPv can be obtained by dissolving specially prepared low DPv cellulose in dilute concentration in aqueous alkali followed by removing water, e.g. by vaporization under a partial vacuum, to obtain a cellulose solution in alkali (alkali viscose) having a high cellulose concentration, e.g. in excess of eight weight percent. In such a case, the viscose is obtained by forming a dilute solution of about 300 to about 525 DPv cellulose and removing the water by vaporization where the cellulose is obtained by treating higher DPv cellulose with acid or steam expansion to reduce the DPv.

Tubular cellulose film food casings made in accordance with the present invention have surprisingly good properties when compared with traditional cellulose film food casings made from high DPv cellulose. In particular such films may have a dry film thickness of from about 0.015 mm to about 0.040 mm, a dry burst pressure in excess of 40 cm Hg, per 0.01 mm of dry film thickness, and a rewet burst pressure in excess of 5 cm Hg per 0.01 mm of rewet film thickness.

Tubular food casings of the present invention may also include fiber reinforced films where the viscose is applied to a fiber web, e.g. a fiber paper or where fibers are blended into the viscose. Such tubular food casings are usually thicker and larger than unreinforced tubular film food casings.

The following examples serve to illustrate and not limit the present invention. Unless otherwise indicated, all parts and percentages are by total weight.

EXAMPLES 1–6

Cellulose having a degree of polymerization (DPv) of about 350 was dissolved at a concentration of about 9 percent in an aqueous solution of from about 5.3 to about 5.6 percent caustic and sufficient $CS_2$ to provide a xanthate sulfur value of from about 1.1 to about 1.5 percent by weight of cellulose with a total sulfur content of from about 1.95 to about 2 percent. The above cellulose solution (viscose) had a ball viscosity of from about 21 to about 39 seconds using a ball having a density of 8 g/cc, a radius of 0.316 cm and a drop of 20 cm. The unripened viscose had an adjusted maturity index of from about 10.2 to about 10.9. "Maturity index" is the number of ml of 10% acetic acid required to congeal the viscose. "Adjusted maturity index" is (viscose caustic wt. % −6.3)×0.3+measured maturity index. The unripened viscose (once filtered through a 10 micron filter) had a filterability K value of from about 2.54 to about 4.55 while viscose that had been ripened ( allowed to stand) and de-aerated under vacuum at 25° C. for more than about 24 hours and filtered twice had all adjusted ripened maturity of 7.9 and a K value of about 1.21. This was the ripened viscose used to form tubular film of the invention and is referred to in the examples as "low DP viscose". "K value"=1000× $[[(T_2-T_1)-(W_2-W_1)]/T_2-T1]$ where $T_1$ is the time of weighing of an 8 ounce sample ($W_1$) prior to filtering through a 4 ounce muslin filter cloth at a pressure of 60 psig. $T_2$ is the time of second weighing after filtration and $W_2$ is the weight of viscose at the second weighing.

The viscose at the high cellulose concentration of 8.9 to 9.2 percent surprisingly had a viscosity that was from about ⅓ to about ½ of the viscosity of standard viscose used to form tubular films. Such standard viscose is a solution of cellulose having a DPv of about 575 at a cellulose concentration of about 7.7 percent, a caustic concentration of about 6.3 percent, a xanthate sulfur concentration of about 1.15 and a total sulfur concentration of about 2.1. The standard viscose thus has a higher waste sulfur problem, a higher waste caustic problem, and a higher viscosity per percentage of dissolved cellulose than the viscose used in accordance with the invention, all of which result in processing advantages of using the low DPv viscose in accordance with the invention as opposed to standard high DPv viscose.

Viscose was extruded through a ring die having an internal ring diameter of about 25 mm and die gap of about 0.35 mm, referred to herein as a code 27 die, to form tubular cellulose film food casings. Both low DP and standard 575 DPv viscoses were used for purposes of comparison. Further various longitudinal stretches were used by varying uptake speed of extruded tubular film. Inflation with air at the pressure shown in Tables 1 and 2 was used to obtain transverse stretch. Viscose flow was adjusted so as to obtain a relatively uniform quantity of extruded cellulose for each of the food casings, i.e. flow for low DPv viscose through the die was about 956 grams (19.8 g/10 meters), while the flow for standard viscose, at lower solids, was about 813 grams per minute to obtain about the same quantity of cellulose solids in the film per unit area.

The extruded cellulose films were regenerated in baths containing a mixture of sodium sulfate and sulfuric acid. The concentrations were about 10.5% sulfuric acid and about 20% sodium sulfate. Less acid was consumed in the regeneration bath for low DP viscose than in the regeneration bath for standard viscose. The differences result because of higher solids concentration in the low DP viscose and lower sulfur and caustic loading in the low DP viscose.

Conditioned X-Y's means that the casing was conditioned at 80% relative humidity. "X-Y" refers to the plot of tube diameter against pressure. "RSD" means recommended stuffing diameter.

The results are shown in Tables 1–11.

EXAMPLE 7

A low DPv cellulose (about 350 DPv) was made by subjecting a high DPv cellulose (about 575 DPv) to a mineral acid. The acid was washed from the cellulose and the cellulose was dissolved in a caustic solution at a cellulose concentration of about 5 percent. Water is then removed from the cellulose solution under a vacuum to form a cellulose solution of about 8 percent. The resulting alkali viscose solution is then extruded to form a cellulose gel tubular film that is washed to remove alkali to form a tubular cellulose food casing.

EXAMPLE 8

Example 7 is repeated except that the DPv of the cellulose is reduced by enzymatic treatment with cellulase. An extrudable caustic solution of the resulting low DPv cellulose is then prepared as in Example 7 to prepare a tubular food casing.

EXAMPLE 9

Example 7 is repeated except that the DPv of the cellulose is reduced by treatment with concentrated-sodium hydroxide solution. The resulting low DPv cellulose does not dissolve in the caustic solution to an extent sufficient to permit formation of an extrudable viscose.

EXAMPLE 10

Example 7 is repeated except that the resulting viscose in extruded upon a cellulose fiber web rolled to form a tube to obtain a tubular fiber reinforced food casing.

The foregoing examples demonstrate that a low DPv cellulose can be used to make a practical tubular cellulose food casing without use of as much $CS_2$ as required in the known art and further that more readily available low DPv cellulose can be practically used. The invention further demonstrates that surprisingly $CS_2$ can be eliminated altogether when caustic is not used in prior treatment of cellulose to lower its DPv. This is entirely unexpected since traditional knowledge held that cellulose could not be dissolved in caustic alone in sufficient concentration to form an extrudable viscose. This misconception was due to the fact that cellulose was almost always treated with caustic prior to dissolution.

TABLE 1

Average Rewet X-Y's Code 27

| Example | Sample Description | Dryer Stretch | Line | Flat Width (mm) | Rewet Flat Width (mm) | Pressure at RSD (Cm Hg) | Diameter at RSD (mm) | Burst Pressure (Cm Hg) | Burst Diameter (mm) | Residual Diameter Stretch (%) | Residual Pressure Strength (%) | Energy to Burst (in lbs) | Thickness (mm) | RSD (mm) |
|---|---|---|---|---|---|---|---|---|---|---|---|---|---|---|
| 1 | Low DPv Viscose-Not Filtered | -2.5% | 140 | 35.0 | 34.0 | 15.0 | 23.7 | 29.1 | 33.0 | 34.8 | 94.1 | 6.0 | 0.072 | 24.5 |
| 2 | Low DPv Viscose-10 u Filtered | -2.5% | 140 | 35.0 | 34.0 | 14.6 | 23.9 | 30.5 | 34.6 | 41.1 | 109.4 | 7.4 | 0.071 | 24.5 |
| 3 | Filtered Low DPv Viscose | 10.0% | 140 | 35.0 | 34.0 | 12.6 | 24.2 | 30.4 | 34.2 | 39.5 | 141.6 | 6.9 | 0.066 | 24.5 |

TABLE 1-continued

Average Rewet X-Y's Code 27

| Example | Sample Description | Dryer Stretch | Line | Flat Width (mm) | Rewet Flat Width (mm) | Pressure at RSD (Cm Hg) | Diameter at RSD (mm) | Burst Pressure (Cm Hg) | Burst Diameter (mm) | Residual Diameter Stretch (%) | Residual Pressure Strength (%) | Energy to Burst (in lbs) | Thickness (mm) | RSD (mm) |
|---|---|---|---|---|---|---|---|---|---|---|---|---|---|---|
| 4 | Filtered Low DPv Viscose Std | −2.5% | 140 | 35.0 | 34.0 | 14.0 | 24.0 | 30.7 | 32.8 | 34.0 | 118.4 | 6.2 | 0.068 | 24.5 |
| 5 | Regular Production Viscose | −2.5% | 139 | 35.0 | 34.0 | 13.0 | 24.1 | 28.8 | 43.7 | 78.3 | 122.0 | 15.6 | 0.066 | 24.5 |
| 6 | Regular Production Viscose | 10.0% | 139 | 35.0 | 34.0 | 10.9 | 24.8 | 28.8 | 44.0 | 79.5 | 164.3 | 15.5 | 0.060 | 24.5 |

TABLE 2

Average Conditioned X-Y's Code 27

| Example | Sample Description | Dryer Stretch | Line | Flat Width (mm) | Cond. Flat Width (mm) | Pressure at RSD (Cm Hg) | Diameter at RSD (mm) | Burst Pressure (Cm Hg) | Burst Diameter (mm) | Residual Diameter Stretch (%) | Residual Pressure Strength (%) | Energy to Burst (in lbs) | Thickness (mm) | RSD (mm) |
|---|---|---|---|---|---|---|---|---|---|---|---|---|---|---|
| 1 | Low DPv Viscose-Not Filtered | −2.5% | 140 | 35.0 | 35.0 | 65.4 |  | 77.4 | 27.1 | 14.0 | 26.3 | 7.5 | 0.033 | 24.5 |
| 2 | Low DPv Viscose-10 u Filtered | −2.5% | 140 | 35.0 | 35.0 | 61.7 |  | 88.5 | 30.4 | 23.9 | 43.4 | 14.3 | 0.032 | 24.5 |
| 3 | Filtered Low DPv Viscose | 10.0% | 140 | 35.0 | 35.0 | 54.2 |  | 86.1 | 30.1 | 22.7 | 59.2 | 13.2 | 0.032 | 24.5 |
| 4 | Filtered Low DPv Viscose Std | −2.5% | 140 | 35.0 | 35.0 | 65.5 |  | 102.2 | 31.5 | 28.6 | 55.9 | 19.1 | 0.034 | 24.5 |
| 5 | Regular Production Viscose | −2.5% | 139 | 35.0 | 35.0 | 70.2 |  | 103.0 | 34.4 | 40.4 | 46.8 | 28.9 | 0.034 | 24.5 |
| 6 | Regular Production Viscose | 10.0% | 139 | 35.0 | 35.0 | 58.9 |  | 99.6 | 34.7 | 41.5 | 69.2 | 27.2 | 0.031 | 24.5 |

TABLE 3

Average Rewet Longitudinal Instron Values

| Example | Sample Description | Dryer Stretch | Line | Force to Break ½" Sample (lbs) | Displacement at user Break (in) | Force to Break 1" Sample (lbs) | Modulus @ 10% (psi) | Maximum Modulus (psi) | Force @ Maximum Tensile (lbs) | Maximum Tensile (lbs) | Elongation @ Maximum Tension (%) | Energy to Break Point (lbs-in) | Energy at Break 1" (lbs-in) |
|---|---|---|---|---|---|---|---|---|---|---|---|---|---|
| 1 | Low DPv Viscose-Not Filtered | −2.5% | 140 | 3.9 | 0.9 | 7.8 | 11,890 | 12,410 | 3.9 | 3,016 | 28.4 | 1.9 | 3.7 |
| 2 | Low DPv Viscose-10 u Filtered | −2.5% | 140 | 3.9 | 0.9 | 7.7 | 9,943 | 10,390 | 3.9 | 2,675 | 30.0 | 1.9 | 3.9 |
| 3 | Filtered Low DPv Viscose | 10.0% | 140 | 5.0 | 0.9 | 9.9 | 20,250 | 20,050 | 5.0 | 3,969 | 27.0 | 2.3 | 4.5 |
| 4 | Filtered Low DPv Viscose Std | −2.5% | 140 | 4.8 | 1.1 | 9.6 | 11,710 | 11,730 | 4.8 | 3,549 | 35.4 | 2.8 | 5.6 |
| 5 | Regular Production Viscose | −2.5% | 139 | 7.2 | 1.6 | 14.5 | 12,020 | 11,840 | 7.2 | 5,354 | 50.5 | 5.8 | 11.6 |
| 6 | Regular Production Viscose | 10.0% | 139 | 6.3 | 1.2 | 12.7 | 17,680 | 17,310 | 6.3 | 4,880 | 36.8 | 3.8 | 7.5 |

TABLE 4

Average Rewet Transverse Instron Values

| Example | Sample Description | Dryer Stretch | Line | Force to Break 1" Sample (lbs) | Displacement at user Break (in) | Force to Break 1" Sample (gms/25 mm) | Modulus @ 10% (psi) | Maximum Modulus (psi) | Force @ Maximum Tensile (lbs) | Maximum Tensile (lbs) | Elongation @ Maximum Tension (%) | Energy to Break Point (lbs-in) |
|---|---|---|---|---|---|---|---|---|---|---|---|---|
| 1 | Low DPv Viscose-Not Filtered | -2.5% | 140 | 6.1 | 0.9 | 5,517 | 3,081 | 5,760 | 6.1 | 2,346 | 64.9 | 2.5 |
| 2 | Low DPv Viscose-10 u Filtered | -2.5% | 140 | 4.3 | 0.8 | 3,889 | 2,730 | 4,145 | 4.3 | 1,481 | 52.4 | 1.6 |
| 3 | Filtered Low DPv Viscose | 10.0% | 140 | 6.2 | 1.0 | 5,640 | 2,386 | 6,194 | 6.2 | 2,493 | 68.5 | 2.5 |
| 4 | Filtered Low DPv Viscose Std | -2.5% | 140 | 6.7 | 1.0 | 6,120 | 3,162 | 5,968 | 6.8 | 2,506 | 65.0 | 2.8 |
| 5 | Regular Production Viscose | -2.5% | 139 | 9.0 | 1.4 | 8,150 | 2,200 | 5,494 | 9.0 | 3,331 | 99.9 | 5.1 |
| 6 | Regular Production Viscose | 10.0% | 139 | 9.6 | 1.6 | 8,715 | 1,827 | 5,625 | 9.6 | 3,701 | 107.9 | 5.7 |

TABLE 5

Average Conditioned Longitudinal Instron Values

| Example | Sample Description | Dryer Stretch | Line | Force to Break ½" Sample (lbs) | Displacement at user Break (in) | Force to Break 1" Sample (lbs) | Modulus @ 10% (psi) | Maximum Modulus (psi) | Force @ Maximum Tensile (lbs) | Maximum Tensile (lbs) | Elongation @ Maximum Tension (%) | Energy to Break Point (lbs-in) | Energy at Break 1" (lbs-in) |
|---|---|---|---|---|---|---|---|---|---|---|---|---|---|
| 1 | Low DPv Viscose-Not Filtered | -2.5% | 140 | 7.2 | 0.9 | 14.4 | 39,400 | 52,280 | 7.2 | 10,270 | 27.2 | 3.9 | 7.0 |
| 2 | Low DPv Viscose-10 u Filtered | -2.5% | 140 | 6.9 | 0.9 | 13.8 | 39,470 | 57,010 | 6.9 | 10,590 | 28.4 | 4.0 | 8.0 |
| 3 | Filtered Low DPv Viscose | 10.0% | 140 | 8.8 | 0.7 | 17.6 | 69,380 | 119,800 | 8.8 | 15,970 | 20.9 | 3.9 | 7.7 |
| 4 | Filtered Low DPv Viscose Std | -2.5% | 140 | 8.3 | 0.9 | 16.6 | 48,640 | 73,040 | 8.3 | 13,840 | 29.4 | 5.0 | 9.9 |
| 5 | Regular Production Viscose | -2.5% | 139 | 10.8 | 1.3 | 21.6 | 56,210 | 66,850 | 10.8 | 19,620 | 40.2 | 8.8 | 17.5 |
| 6 | Regular Production Viscose | 10.0% | 139 | 10.0 | 0.7 | 20.0 | 75,880 | 119,700 | 10.0 | 18,210 | 23.4 | 4.8 | 9.6 |

TABLE 6

Average Conditioned Transverse Instron Values

| Example | Sample Description | Dryer Stretch | Line | Force to Break 1" Sample (lbs) | Displacement at user Break | Force to Break 1" Sample (gms/25 mm) | Modulus @ 10% (psi) | Maximum Modulus (psi) | Force @ Maximum Tensile (lbs) | Maximum Tensile (lbs) | Elongation @ Maximum Tension (%) | Energy to Break Point (lbs-in) |
|---|---|---|---|---|---|---|---|---|---|---|---|---|
| 1 | Low DPv Viscose-Not Filtered | -2.5% | 140 | 8.0 | 0.5 | 7,282 | 15,410 | 109,200 | 8.0 | 5,735 | 35.2 | 3.0 |
| 2 | Low DPv Viscose-10 u Filtered | -2.5% | 140 | 7.7 | 0.5 | 6,971 | 17,200 | 82,130 | 7.7 | 5,912 | 34.5 | 2.8 |
| 3 | Filtered Low DPv Viscose | 10.0% | 140 | 9.6 | 0.8 | 8,686 | 15,580 | 44,120 | 9.6 | 8,708 | 56.1 | 5.1 |

TABLE 6-continued

Average Conditioned Transverse Instron Values

| Example | Sample Description | Dryer Stretch | Line | Force to Break 1" Sample (lbs) | Displacement at user Break | Force to Break 1" Sample (gms/25 mm) | Modulus @ 10% (psi) | Maximum Modulus (psi) | Force @ Maximum Tensile (lbs) | Maximum Tensile (lbs) | Elongation @ Maximum Tension (%) | Energy to Break Point (lbs-in) |
|---|---|---|---|---|---|---|---|---|---|---|---|---|
| 4 | Filtered Low DPv Viscose Std | -2.5% | 140 | 11.0 | 0.7 | 10,010 | 20,970 | 111,800 | 11.0 | 9,194 | 45.9 | 5.2 |
| 5 | Regular Production Viscose | -2.5% | 139 | 7.9 | 0.4 | 7,184 | 18,510 | 232,400 | 7.9 | 7,199 | 25.4 | 2.1 |
| 6 | Regular Production Viscose | 10.0% | 139 | 6.5 | 0.5 | 5,879 | 13,030 | 157,600 | 6.5 | 5,892 | 31.5 | 2.1 |

TABLE 7

| Example | Sample Description | Dryer Stretch | Line | Birefringence | BDG | DPv | Gel Check | Glycerine | Total Sulfur (ppm) |
|---|---|---|---|---|---|---|---|---|---|
| 1 | Low Dpv Viscose-Not Filtered | -2.5% | 140 | 0.0077 | 21.6 | 310 | No Gels | 25.50 | 1502 |
| 2 | Low DPv Viscose-10 u Filtered | -2.5% | 140 | 0.0072 | 21.4 | 396 | No Gels | 26.20 | 1434 |
| 3 | Filtered Low DPv Viscose | 10.0% | 140 | 0.0115 | 20.0 | 385 | No Gels | 26.28 | 1472 |
| 4 | Filtered Low DPv Viscose Std | -2.5% | 140 | 0.0071 | 21.8 | 308 | No Gels | 24.81 | 1527 |
| 5 | Regular Production Viscose | -2.5% | 139 | 0.0092 | 22.1 | 577 | No Gels | 20.37 | 1748 |
| 6 | Regular Production Viscose | 10.0% | 139 | 0.0139 | 20.6 | 575 | No Gels | 20.81 | 1740 |
|  | Standard or Typical Values |  |  |  | 21.7 | 585 |  |  |  |

TABLE 8

| Example | Sample Description | Dryer Stretch | Line | Permeability | pH | Avg. % Skin | Average Outside Skin | Average Inside Skin |
|---|---|---|---|---|---|---|---|---|
| 1 | Low Dpv Viscose-Not Filtered | -2.5% | 140 | 416 | 8.8 | 4.96 | <250 nm | 1.39 |
| 2 | Low DPv Viscose-10 u Filtered | -2.5% | 140 | 450 | 8.6 | 11.58 | 1.68 | 1.21 |
| 3 | Filtered Low DPv Viscose | 10.0% | 140 | 440 | 8.8 | 7.59 | 0.95 | 1.10 |
| 4 | Filtered Low DPv Viscose Std | -2.5% | 140 | 273 | 8.7 | 13.42 | 2.34 | 1.28 |
| 5 | Regular Production Viscose | -2.5% | 139 | 245 | 8.6 | 14.15 | 2.35 | 1.33 |
| 6 | Regular Production Viscose | 10.0% | 139 | 233 | 9.0 | 9.14 | 1.31 | 1.16 |
|  | Standard or Typical Values |  |  | 270 |  |  |  |  |

TABLE 9

| Test ID | Emulsion Type | Water Content | Starch Type | Casing Description | Stuffing Diameter | Stuffing Temperature | Stuffing Comments | Slip/No Slip | Peeling Performance | Peeling Comments Peeled immediately after cooking |
|---|---|---|---|---|---|---|---|---|---|---|
| 5 | Chicken (159#) | 25% | 12.5% | Standard Viscose/Standard Stretch | 25.5 mm | 58° F. | 0 defects | Good | 100% 0 misses out of 84 hot dogs | Internal temperature after tap water shower of 111° F. and out of 7 min. bath at 54° F. |
| 2 |  |  |  | Low DPv Viscose/Standard Stretch | 25.5 mm |  | 1 linker break | Good | 100% | 0 misses out of 81 hot dogs |
| 6 |  |  |  | Standard Viscose/10% Stretch | 25.8 mm |  | 0 defects | Good | 100% | 0 misses out of 80 hot dogs. |
| 3 |  |  |  | Low DPv Viscose/10% Stretch | 25.9 mm |  | 1 linker break | Good | 100% | 0 misses out of 67 hot dogs. |

TABLE 10

| Test ID | Emulsion Type | Water Content | Starch Type | Casing Description | Stuffing Diameter | Stuffing Temperature | Stuffing Comments | Slip/No Slip | Peeling Performance | Peeling Comments after cooking hold 45 minutes at 70° F. prior to peeling |
|---|---|---|---|---|---|---|---|---|---|---|
| 5 | Chicken (159#) | 25% | 12.5% | Standard Viscose/Standard Stretch | 25.5 mm | 58° F. | 0 defects | None | 21% 74 misses out of 94 hot dogs | Staging time at 45 minutes. Internal temperature after staging at 77° F. and out of 7 min. bath at 47° F. |

TABLE 10-continued

| Test ID | Emulsion Type | Water Content | Starch Type | Casing Description | Stuffing Diameter | Stuffing Temperature | Stuffmg Comments | Slip/ No Slip | Peeling Performance | Peeling Comments after cooking hold 45 minutes at 70° F. prior to peeling |
|---|---|---|---|---|---|---|---|---|---|---|
| 2 | | | | Low DPv Viscose/ Standard Stretch | 25.5 mm | | 0 defects | None | 8% | 83 misses out of 90 hot dogs. |
| 6 | | | | Standard Viscose/ 10% Stretch | 25.8 mm | | 0 defects | None | 24% | 71 misses out of 94 hot dogs. |
| 3 | | | | Low DPv Viscose/10% Stretch | 25.9 mm | | 0 defects | None | 18% | 73 misses out of 89 hot dogs. |

TABLE 11

| Test ID | Emulsion Type | Water Content | Starch Type | Casing Description | Stuffing Diameter | Stuffing Temperature | Stuffmg Comments | Slip/ No Slip | Peeling Performance | Peeling Comments after cooking hold 90 minutes at 70° F. prior to peeling |
|---|---|---|---|---|---|---|---|---|---|---|
| 5 | Chicken (159#) | 25% | 12.5% | Standard Viscose/ Standard Stretch | 25.6 mm | 58° F. | 0 defects | None | 4% 82 misses out of 85 hot dogs | Staging time at 90 minutes. Internal temperature after staging at 78° F. and out of 7 min. bath at 43° F. |
| 2 | | | | Low DPv Viscose/ Standard Stretch | 25.5 mm | | 0 defects | None | 6% | 82 misses out of 87 hot dogs. |
| 6 | | | | Standard Viscose/ 10% Stretch | 25.7 mm | | 0 defects | None | 1% | 85 misses out of 86 hot dogs. |
| 3 | | | | Low DPv Viscose/10% Stretch | 25.9 mm | | 1 split out | None | 0% | 74 misses out of 74 hot dogs. |

Comments:
*Evaluate casing produced on PM 10½ with standard viscose and with (high viscose cellulose and low DPv) Low DPv viscose in standard dryer stretch & T400 mode.
*100% Chicken, 25% water (based on chicken weight); 12.5% corn starch (based on chicken weight), with Heller Seasonings (9.6 lbs).
*Cook cycle: 150 F. DB/0 F. WB for 15 min; 158 F. DB/158 F. WB for 30 min; 167 F. DB/167 F. WB for 30 min; 172 F. DB/172 F. WB for 15 min; 176 F. DB/176 F. WB for 7 min; 176 F. DB/0 F. WB for 1 min; tap water shower with door open 6" until 111 F. int. temp is reached; vary staging time 0, 45 & 90 min; then 7 min chilled bath.

What is claimed is:

1. A tubular food casing comprising a tubular cellulose film precipitated from a viscose solution having a viscosity of from about 55 to about 90 ball seconds, where the ball has a density of 8 g/cc and a radius of 0.316 centimeters at a drop of 20 centimeters, and where the solution contains at least eight and one-half weight percent of cellulose, said cellulose having a DPv of from about 300 to about 525, said cellulose film having a dry film thickness of from about 0.015 mm to about 0.050 mm, a dry burst pressure in excess of 40 cm Hg, per 0.01 mm of dry film thickness, and a rewet burst pressure in excess of 5 cm Hg per 0.0 mm of rewet film thickness.

2. The food casing of claim 1 wherein the cellulose has a DPv of about 400 to about 475 and the dry film thickness is from about 0.015 mm to about 0.040 mm.

3. The food casing of claim 1 wherein the viscose is a xanthate viscose containing a caustic concentration of from about 4.5 to about 6.5 weight percent and a viscose total sulfur concentration of from about 1.8 to about 2.5 weight percent and the cellulose is precipitated by passing extruded viscose through a bath comprising a strong acid and a salt.

4. The food casing of claim 1 wherein the viscose is a solution comprising non-derivatized cellulose in a solvent comprising tertiary amine oxide and water obtained by forming a dilute solution of about 300 to about 525 DPv cellulose and removing water by vaporization and the cellulose is precipitated by passing extruded viscose through a wash bath comprising water to remove tertiary amine oxide.

5. The food casing of claim 4 wherein the water is removed in a partial vacuum.

6. The food casing of claim 1 wherein the viscose comprises a non-derivatized cellulose in a solvent comprising water and sodium hydroxide obtained by forming a dilute solution of about 300 to about 525 DPv cellulose and removing the water by vaporization where the cellulose is obtained by treating higher DPv cellulose with acid to reduce the DPv.

7. The food casing of claim 6 wherein the water is removed in a partial vacuum.

8. The food casing of claim 6 wherein the cellulose is precipitated by passing extruded viscose through a wash bath comprising water to remove sodium hydroxide.

9. A method for making the tubular food casing of claim 1 which comprises:
   a) preparing a viscose solution, containing at least eight and one-half weight percent of cellulose having a DPv of about 300 to about 525, and having a solution viscosity of from about 55 to about 90 ball seconds, where the ball has a density of 8 grams per cubic centimeter and a radius of 0.316 cm, at a drop of 20 centimeter;
   b) extruding the solution into the shape of a tube; and
   c) precipitating cellulose from the extruded solution to form a tubular film having a dry film thickness of from about 0.015 mm to about 0.050 mm, a dry burst pressure in excess of 40 cm Hg, per 0.01 mm of dry film thickness, and a rewet burst pressure in excess of 5 cm Hg per 0.0 1 mm of rewet film thickness.

10. The method of claim 9 wherein the cellulose has a DPv of about 425 to less than 500.

11. The method of claim 9 wherein the viscose is a xanthate viscose containing a caustic concentration of from about 4.5 to about 6.5 weight percent and a viscose total sulfur concentration of from about 1.8 to about 2.5 weight percent and the cellulose is precipitated by passing extruded viscose through an aqueous bath comprising acid and a salt.

12. The method of claim 9 wherein the viscose is a solution comprising non-derivatized cellulose in a solvent comprising tertiary amine oxide and water obtained by forming a dilute solution of about 300 to about 525 DPv cellulose and removing water by vaporization and the cellulose is precipitated by passing extruded viscose through a wash bath comprising water to remove tertiary amine oxide.

13. The method of claim 12 wherein the water is removed in a partial vacuum.

14. The method of claim 9 wherein the viscose comprises a non-derivatized cellulose in a solvent comprising water and sodium hydroxide obtained by forming a dilute solution of about 300 to about 525 DPv cellulose and removing the water by vaporization.

15. The method of claim 14 wherein the water is removed in a partial vacuum.

16. The method of claim 15 wherein the cellulose is precipitated by passing extruded viscose through a wash bath comprising water to remove sodium hydroxide.

17. The method of claim 9 wherein the dissolving cellulose has a DPv of between about 300 to about 400.

18. The method of claim 9 where the dry film thickness is from about 0.015 mm to about 0.040 mm.

19. The method of claim 9 wherein the viscose is an alkali solution of cellulose formed from a higher DPv cellulose by steam.

20. The method of claim 9 wherein the viscose is an alkali solution of cellulose formed from a higher DPv cellulose by treatment with acid.

* * * * *

UNITED STATES PATENT AND TRADEMARK OFFICE
CERTIFICATE OF CORRECTION

PATENT NO. : 6,767,598 B1 Page 1 of 1
APPLICATION NO. : 09/723681
DATED : July 27, 2004
INVENTOR(S) : John Jeff Halftown, Mark Van Der Bleek and Michael Verellen It is certified that error appears in the above-identified patent and that said Letters Patent is hereby corrected as shown below:

Col. 1, line 8, after "cellulose" delete "-".

Col. 4, line 29, after "concentrated" delete "-".

Col. 11, line 47, replace "0.0" with --0.01--.

Col. 12, line 54, replace "centimeter" with --centimeters--.

Col. 12, line 62, replace "0.0 1" with --0.01--.

Signed and Sealed this

Third Day of June, 2008

JON W. DUDAS
*Director of the United States Patent and Trademark Office*